US009523608B2

United States Patent
Xu et al.

(10) Patent No.: US 9,523,608 B2
(45) Date of Patent: *Dec. 20, 2016

(54) MATERIAL IDENTIFICATION FROM A SPECTRAL FILTERED PATTERNED IMAGE WITHOUT DEMOSAICING

(71) Applicant: Xerox Corporation, Norwalk, CT (US)

(72) Inventors: Beilei Xu, Penfield, NY (US); Lalit Keshav Mestha, Fairport, NY (US); Yao Rong Wang, Webster, NY (US); Peter Paul, Wesbter, NY (US)

(73) Assignee: Xerox Corporation, Norwalk, CT (US)

( * ) Notice: Subject to any disclaimer, the term of this patent is extended or adjusted under 35 U.S.C. 154(b) by 779 days.

This patent is subject to a terminal disclaimer.

(21) Appl. No.: 13/715,446

(22) Filed: Dec. 14, 2012

(65) Prior Publication Data

US 2014/0168421 A1 Jun. 19, 2014

(51) Int. Cl.
*G01N 21/01* (2006.01)
*G01J 3/28* (2006.01)
(Continued)

(52) U.S. Cl.
CPC ............... *G01J 3/2823* (2013.01); *G01J 3/36* (2013.01); *G01J 3/51* (2013.01); *G01J 3/513* (2013.01);
(Continued)

(58) Field of Classification Search
None
See application file for complete search history.

(56) References Cited

U.S. PATENT DOCUMENTS 6,718,049 B2 * 4/2004 Pavlidis ............. G06K 9/00228
348/164
2005/0285966 A1 * 12/2005 Bamji ...................... G01C 3/08
348/336
(Continued)

OTHER PUBLICATIONS

Wang et al., "Determining a Total Number of People in a IR Image Obtained Via an IR Imaging System," U.S. Appl. No. 12/967,775, filed Dec. 14, 2010.
(Continued)

*Primary Examiner* — William C Vaughn, Jr.
*Assistant Examiner* — Stuart Bennett
(74) *Attorney, Agent, or Firm* — Philip E. Blair; Fleit Gibbons Gutman Bongini & Bianco P.L.

(57) ABSTRACT

What is disclosed is a system and method for processing image data acquired using a multi-band infrared camera system with a spectral mosaic filter arranged in a geometric pattern without having to perform a demosaicing that is typical with processing data from an array of sensors. In one embodiment, image data that has been captured using a camera system that has a spectral filter mosaic comprising a plurality of spectral filters arrayed on a grid. A material index is determined, using intensity values collected by sensor elements associated with a cell's respective spectral filters. All of the material indices collectively generate a material index image. Thereafter, material identification is performed on the material index image using, for example, pixel classification. Because the demosaicing step can be effectively avoided, image processing time is reduced. The teachings hereof find their uses in a wide array of applications including automated HOV/HOT violation detection.

24 Claims, 5 Drawing Sheets

(51) Int. Cl.
*G06K 9/00* (2006.01)
*H04N 5/33* (2006.01)
*G01J 3/51* (2006.01)
*G01J 3/36* (2006.01)
*G06K 9/20* (2006.01)
*H04N 9/07* (2006.01)

(52) U.S. Cl.
CPC ....... *G06K 9/00369* (2013.01); *G06K 9/00785* (2013.01); *G06K 9/2018* (2013.01); *H04N 5/332* (2013.01); *H04N 9/07* (2013.01)

(56) References Cited

U.S. PATENT DOCUMENTS

| | | | |
|---|---|---|---|
| 2006/0157640 A1* | 7/2006 | Perlman | H04N 5/2254 250/208.1 |
| 2007/0023663 A1* | 2/2007 | Chen | G01J 3/02 250/339.02 |
| 2010/0302406 A1* | 12/2010 | Peng et al. | 348/223.1 |
| 2011/0101205 A1* | 5/2011 | Tian | H04N 5/332 250/208.1 |
| 2012/0147194 A1* | 6/2012 | Wang et al. | 348/164 |
| 2012/0262577 A1* | 10/2012 | Wang et al. | 348/148 |

OTHER PUBLICATIONS

Wang et al., "Determining a Number of Objects in an IR Image", U.S. Appl. No. 13/086,006, filed Apr. 28, 2011.
Wang, et al., "Determining a Pixel Classification Threshold for Vehicle Occupancy Detection", U.S. Appl. No. 13/324,308, filed Dec. 13, 2011.
Wang et al., "Multi-Band Infrared Camera System Optimized for Skin Detection", U.S. Appl. No. 13/416,436, filed Mar. 9, 2012.
Mestha et al., "Removing Environment Factors From Signals Generated From Video Images Captured for Biomedical Measurements", U.S. Appl. No. 13/401,207, filed Feb. 21, 2012.
Xu et al., "A Multi-Layer Array for a Multi-Resolution Multi-Spectral Camera," U.S. Appl. No. 13/239,642, filed Sep. 22, 2011.
Wang, et al., "Post-Processing a Multi-Spectral Image for Enhanced Object Identification", U.S. Appl. No. 13/324,368, filed Dec. 13, 2011.
Wang, et al., "Post-Processing a Multi-Spectral Image for Enhanced Object Identification", U.S. Appl. No. 13/324,433, filed Dec. 13, 2011.
Cohen, Rami, "Demosaicing Algorithms", Aug. 30, 2010.
Li et al., "Image Demosaicing: A Systematic Survey".

* cited by examiner

MATERIAL IDENTIFICATION FROM A SPECTRAL FILTERED PATTERNED IMAGE WITHOUT DEMOSAICING

TECHNICAL FIELD

The present invention is directed to systems and methods for performing material identification from a spectral-filtered patterned image captured using a multi-band infrared camera system with a mosaic of spectral filter cells arrayed in a geometric pattern without having to perform a demosaicing operation that is typical with processing raw image data from such patterned sensor arrays.

BACKGROUND

Car-pool vehicles and other vehicles carrying multiple passengers reduce fuel consumption, pollution, and highway congestion, relative to single-occupancy vehicles. Highway authorities provide various incentives for high occupancy vehicles which include allowing such vehicles to travel in traffic lanes limited to high occupancy vehicles (HOV lanes) and traffic lanes where a toll charged is reduced or eliminated for high occupancy vehicles (HOT lanes). Monetary penalties are imposed on drivers of vehicles travelling with less than a predetermined number of occupants (e.g., less than 2) in these restricted lanes. Recent efforts have been directed toward sensing and image capture systems and methods to effectuate HOV lane enforcement. Further development in this art is needed as entirely automatic solutions for determining the number of occupants in a moving motor vehicle can be quite challenging. While ordinary visible-light can be used for automated vehicle occupancy detection through the front windshield under ideal conditions, cabin penetration using visible light can be easily compromised by factors such as tinted side windshields as well as environmental conditions such as rain, snow, dirt, and the like. Moreover, artificial visible illumination at night may be distracting to drivers. Near infrared (NIR) illumination's one primary advantage over a visible light illumination source is that NIR illumination is less intrusive to the human eye. Thus, the ability to specifically detect humans improves by working in these wavelength bands. Not only does this make such a system more resistant to efforts to defeat it, but the task of human occupancy detection becomes more achievable and more reliable.

Active near-infrared (NIR) illumination has been applied to address those extrinsic effects but better overall performance is still desired in practical applications due to the similarity in reflectance of human skin and other materials, reflected light from windows, stray light from the environment, weather conditions, etc. Single-band infrared cameras using 2D imaging in the NIR wavelength range with CCD or CMOS detector arrays are available at relatively low cost. Many multi-band infrared camera systems use the short wave infrared (SWIR) band by imaging on, for instance, an InGaAs detector array with multiple filters. These systems exploit physical geometries and material properties at different optical wavelengths in the infrared band. Furthermore, in the SWIR band, human skin has reflectance values below other materials, such as cotton, wool, polyamide, and leather that are commonly found inside a passenger compartment of a motor vehicle. Single-band approaches have been demonstrated to be effective in detecting front-seat passengers. However, comparing to the single-band approach, biometric based, i.e., skin identification, HOV/HOT violation detection is more robust against object occlusion and posture variations. This is especially true for rear-seat passenger detection where only partial faces are likely to be captured in the image data. Rear-seat passenger detection is of particular interest to HOV3 systems where 3 or more vehicle occupants are required and in HOT enforcement where the amount of toll depends on the number of passengers in the vehicle, in both the front and rear seats. There is customer-driven demand for a multi-band IR camera system for HOV/HOT violation detection using a spectral mosaic filter. Methods are needed for processing image data from an image sensor that incorporates a mosaic infrared filter arranged in a pattern for material identification in a vehicle occupancy detection system.

In order to reconstruct the full image from the raw image data, interpolation needs to be performed to fill in the blanks for each spectral components acquired using a mosaic filter. A demosaicing algorithm estimates, for each pixel in the image, intensity levels for all spectral components. For example, most modern digital cameras acquire images using a single image sensor overlaid with a color filter array, so demosaicing is part of the processing pipeline required to render images into a viewable format. The reader is directed to the survey paper: "*Image Demosaicing: A Systematic Survey*", by Xin Li, Bahadir Gunturk and Lei Zhang, Proceedings of SPIE, Vol. 6822, Issue No 2, pp. 68221J-68221J-15(2008), ISSN: 0277786X.

Accordingly, what is needed in this art are increasingly sophisticated systems and methods for performing material identification from a patterned image captured using a multi-band infrared camera system with a mosaic of spectral filter cells arrayed in a geometric pattern without having to perform a demosaicing operation such that materials of objects in the patterned image can be identified.

INCORPORATED REFERENCES

The following U.S. Patents, U.S. Patent Applications, and Publications are incorporated herein in their entirety by reference.

"Determining A Total Number Of People In An IR Image Obtained Via An IR Imaging System", U.S. Pat. No. 8,520,074 which discloses a ratio method for classifying pixels in an IR image.

"Determining A Number Of Objects In An IR Image", U.S. Pat. No. 8,587,657 which discloses a correlation method and a best fitting reflectance method for classifying pixels in an IR image.

"Determining A Pixel Classification Threshold For Vehicle Occupancy Detection", U.S. patent application Ser. No. 13,324,308 by Wang et al., which discloses a method for determining a threshold used for pixel classification.

"Multi-Band Infrared Camera System Optimized For Skin Detection", U.S. patent application Ser. No. 13,416, 436 by Wang et al. which discloses a method for determining an optimal wavelength band combination for filters of an infrared camera used for acquiring infrared images containing skin tissue, and an infrared camera system with filters selected using the optimization method "Removing Environment Factors From Signals Generated From Video Images Captured For Biomedical Measurements", U.S. patent application Ser. No. 13,401,207 by Mestha et al. which discloses a method for removing undesirable signals and background noise from signals generated from video images captured using an Infrared (IR) camera.

"A Multi-Filter Array For A Multi-Resolution Multi-Spectral Camera", U.S. Pat. No. 8,600,227, which discloses a camera system with filters arrayed in a geometric pattern.

"Post-Processing A Multi-Spectral Image For Enhanced Object Identification", U.S. Pat. No. 8,818,030, which discloses a method for post-processing a multi-spectral image which has been pre-processed via a pixel classification method such that objects in the image are more correctly identified.

"Post-Processing A Multi-Spectral Image For Enhanced Object Identification", U.S. Pat. No. 8,457,415, which discloses a method for post-processing a multi-spectral image which has been pre-processed via a pixel classification method such that objects in the image are more correctly identified.

BRIEF SUMMARY

What is disclosed is a system and method for performing material identification from a patterned image captured using a multi-band infrared camera system with a mosaic spectral filter elements arrayed in a geometric pattern without having to perform a demosaicing operation such that materials of objects in the patterned image (and subsequently in the scene) can be identified. Because the demosaicing operation can be avoided, image processing time and data storage are reduced. The teachings hereof find their uses in a wide array of applications including image analysis, object tracking, material identification, skin detection, object counting, to name a few, and in automatic vehicle occupancy detection systems.

One embodiment of the present method for performing material identification using a patterned image acquired by a multi-band IR camera system with a mosaic of spectral filter cells arrayed in a 2D grid involves performing the following steps. First, a patterned image, such as a Bayer patterned image, is received that was captured by a multi-band IR camera system with a mosaic filter comprising a plurality of spectral filter cells aligned on a 2D grid. Each of the spectral filter cells comprises of plurality of spectral filter elements, filters source light by a desired wavelength range of interest. Each spectral filter element is aligned with a sensing element in the camera's detector array. The sensing element collects separate filtered intensity values for each pixel location in the image. Next, for each spectral filter cell in the 2D grid, a material index is determined using intensity values collected by a set of sensor elements within the cell. In one embodiment, the spectral filter cells comprise at least 3 different filter elements with at least one filter element falling in a wavelength range of either short wave infrared (SWIR), mid-wave infrared (MWIR), or long wave infrared (LWIR). One filter element may be duplicated to form 4 filter elements in one cell. Material identification is performed on the image using the material indices. Various embodiments are disclosed.

Many features and advantages of the above-described method will become readily apparent from the following detailed description and accompanying drawing

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for performing material identification from a patterned image captured using a multi-band infrared camera system with a mosaic of spectral filter cells arrayed in a 2D geometric pattern without having to perform a demosaicing operation such that materials of objects in the patterned image can be identified.

It should be understood that one of ordinary skill in this art would be readily familiar with many facets of IR camera systems, color filter arrays, Bayer filters, arrays of detectors, image processing methods involving pixel intensity values, and various pixel classification and material identification techniques.

Non-Limiting Definitions

Figure 3:
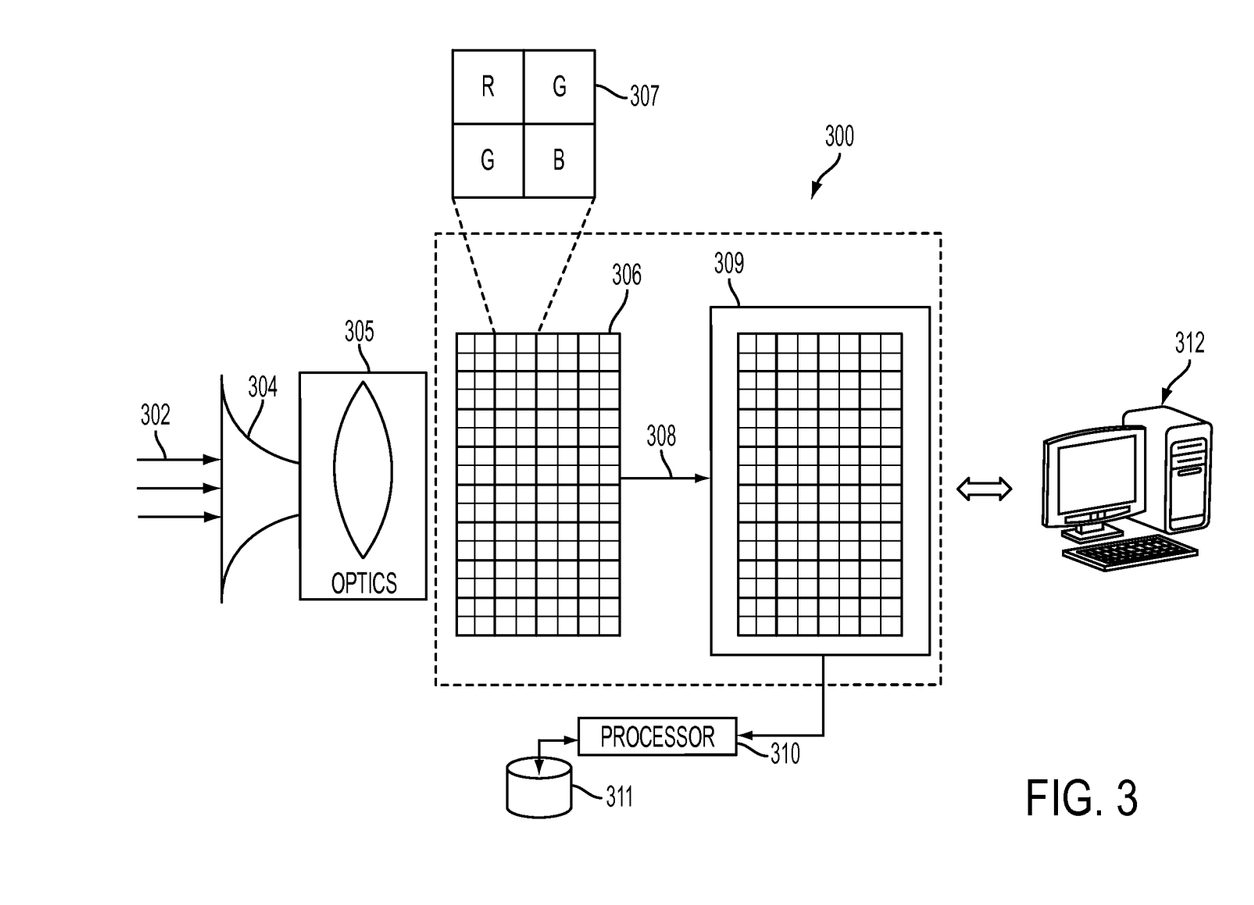
FIG. 3 shows one embodiment of a multi-band camera system with a mosaic of spectral filters in the optical path.

A "material index" is used to identify at least one object in the image. In one embodiment, a material index for a given spectral filter cell with 4 spectral elements comprises:

$$I = \frac{a - d}{\text{average}(b, c) - d} \quad (1)$$

where (a, b, c, d) are neighboring filter/sensor elements in, for example, a 2×2 filter cell shown in FIG. 3, and b,c represent the respective intensity values collected by sensor elements through spectral filters which are common, and a, d are intensity values collected by sensor elements through spectral filters which are different than the common spectral filters. As an example, comparing to FIG. 3, the filter element 'a' can be 'R' filter, 'b' can be 'G' filter, 'c' can be another 'G' filter of the same kind as 'b', and 'd' can be 'B' filter.

A generalized version of Eq. (1) can be written as:

$$I = \frac{f_a(a, b, c, d) - f_d(a, b, c, d)}{f_{b,c}(a, b, c, d) - f_d(a, b, c, d)} \quad (2)$$

where $f_a$, $f_{b,c}$ and $f_d$ are linear functions, and (a, b, c, d) are intensity values collected by sensor elements associated with spectral filter elements corresponding to filter types a, b, c, and d located in super cells consisting of multiple 2×2 cells in a localized neighborhood.

In another embodiment, a material index for a given spectral filter cell comprises:

$$I = \frac{a - \text{average}(b, c)}{a + d} \quad (3)$$

where (a, b, c, d) are neighboring sensor elements in a 2×2 cell, and b, c represent the respective intensity values collected by sensor elements through spectral filters which are common, and a, d are intensity values collected by sensor elements through spectral filters which are different than the common spectral filters.

A generalized version of Eq. (3) can be written as:

$$I = \frac{f_a(a, b, c, d) - f_{b,c}(a, b, c, d)}{f_a(a, b, c, d) + f_d(a, b, c, d)} \quad (4)$$

where $f_a$, $f_{b,c}$ and $f_d$ are linear functions, and (a, b, c, d) are intensity values collected by sensor elements associated with spectral filter elements corresponding to filter types a, b, c, and d located in super cells consisting of multiple 2×2 cells in a localized neighborhood.

A "material index image" is an image containing material indices. The material index image may have one material index at each pixel location within the image or may have one material index per cluster of pixel locations in the image.

Figure 1:
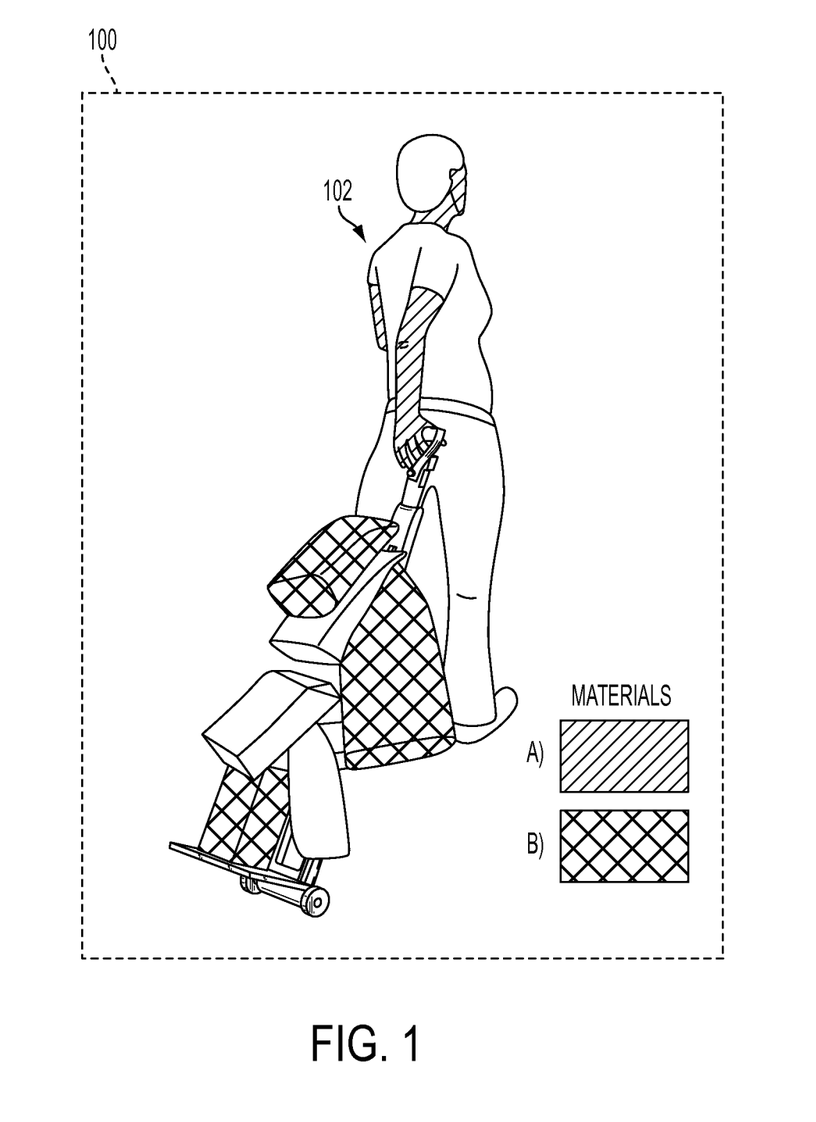
FIG. 1 shows an example image of a person pulling a wheeled device loaded with packages which has been processed for material identification using a pixel classification technique.

"Pixel classification" refers to a method for material classification followed by identification using the determined material indices. Embodiments for performing pixel classification include a ratio method, a correlation coefficient method, and a best fitting reflectance method. FIG. 1 shows an example image 100 of a person 102 pulling a wheeled device loaded with packages. Image 100 has been processed using a pixel classification technique. For explanatory purposes, the materials of interest in FIG. 1 which have been identified using a pixel classification method are human skin tissue (material 'A') and a plastic such as PET, HDPE or LDPE (material 'B').

A "geometric pattern" refers to any geometric shape having either a fixed or variable size. Such a pattern may comprise, for example, the Bayer pattern of FIG. 2. Other patterns may be a hexagonal shape. It should be appreciated that any geometric shape which filters can be arranged in accordance with the teachings hereof is intended to fall within the scope of the appended claims.

Figure 2:
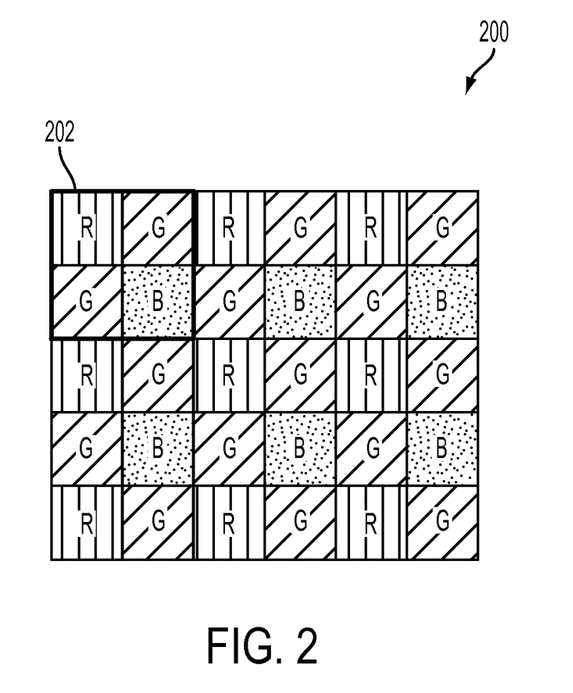
FIG. 2 illustrates one commonly used filter array configuration known as a Bayer pattern mosaic.

A "spectral filter cell" refers to a two dimensional arrangement of spectral filter elements arrayed in a geometric pattern with each filter element transmitting a desired wavelength band and rejecting wavelengths outside that band. In FIG. 2, each spectral filter cell 202 comprises a 2×2 grid of spectral filter elements. The collection of spectral filter cells forms a patterned mosaic 200 of spectral filter cells. Each spectral filter element in the mosaic is aligned with a unique sensor of the camera's detector array.

A "detector array" refers to a camera's array of IR sensor elements which sample radiation emitted by an illumination source and which record intensity values at pixels locations along the grid. The detector array functions to spatially resolve the received light and output raw image data to either a processor or a memory. The sensitivities of the sensors in the detector array can be made selectable array using a controller. The detector array may comprise materials such as: Mercury Cadmium Telluride (HgCdTe), Indium Arsenide (InAs), Indium Gallium Arsenide (InGaAs), Indium Antimonide (InSb), and/or Lead Sulphide (PbS). This list is not exhaustive and thus should not to be viewed as limiting. Other sensors not listed which are already in existence or which may be developed are intended to fall within the scope of the appended claims.

A "multi-band IR camera system" is multi-spectral apparatus which generally comprises at least one IR illuminator and a plurality of IR sensor elements on a detector array to capture IR light reflected from or transmitted through a target object, separate it into its component wavelengths, and output IR image data of that target. Such a camera system also may incorporate a storage device, a memory, and a processor capable of executing machine readable program instructions. FIG. 3 illustrates one embodiment of a multi-band IR camera 300. Source light 302 enters the camera through an aperture 304 and passes through optics 305. The focused light passes through the camera's spectral filter array 306 which, in this embodiment, is shown arranged in the Bayer pattern of FIG. 2. Each filter cell 307 comprises a 2×2 grid of spectral filter elements. The filtered source light 308 is captured by the camera's detector array 309 shown comprising a corresponding array of sensor elements with each sensor element having a one-to-one relationship with the individual filter elements of spectral filter array 306. It should be appreciated that detector array 309 is illustrative. Sensor elements in the detector array record intensity values at pixel locations along a grid. The detector array communicates the acquired spectral data comprising the IR image to processor 310 for processing and to storage device 311. Various elements of the camera of FIG. 3, including processor 310 and storage device 311 may be in communication with workstation 312. Any of the components of IR camera of FIG. 3 may be placed in communication with one or more remote devices over a network (not shown).

In order to reconstruct a full color image from the raw image data, a form of interpolation is needed to fill in the blanks for each color separation. This interpolation is called demosaicing. Most modern digital cameras acquire images using a single image sensor overlaid with a CFA, so demosaicing is part of the processing pipeline required to render images into a viewable format. It should be understood that the present invention performs material identification on raw image data comprising the Bayer pattern image without having to perform a demosaicing step on the image data.

Flow Diagram of One Embodiment

Figure 4:
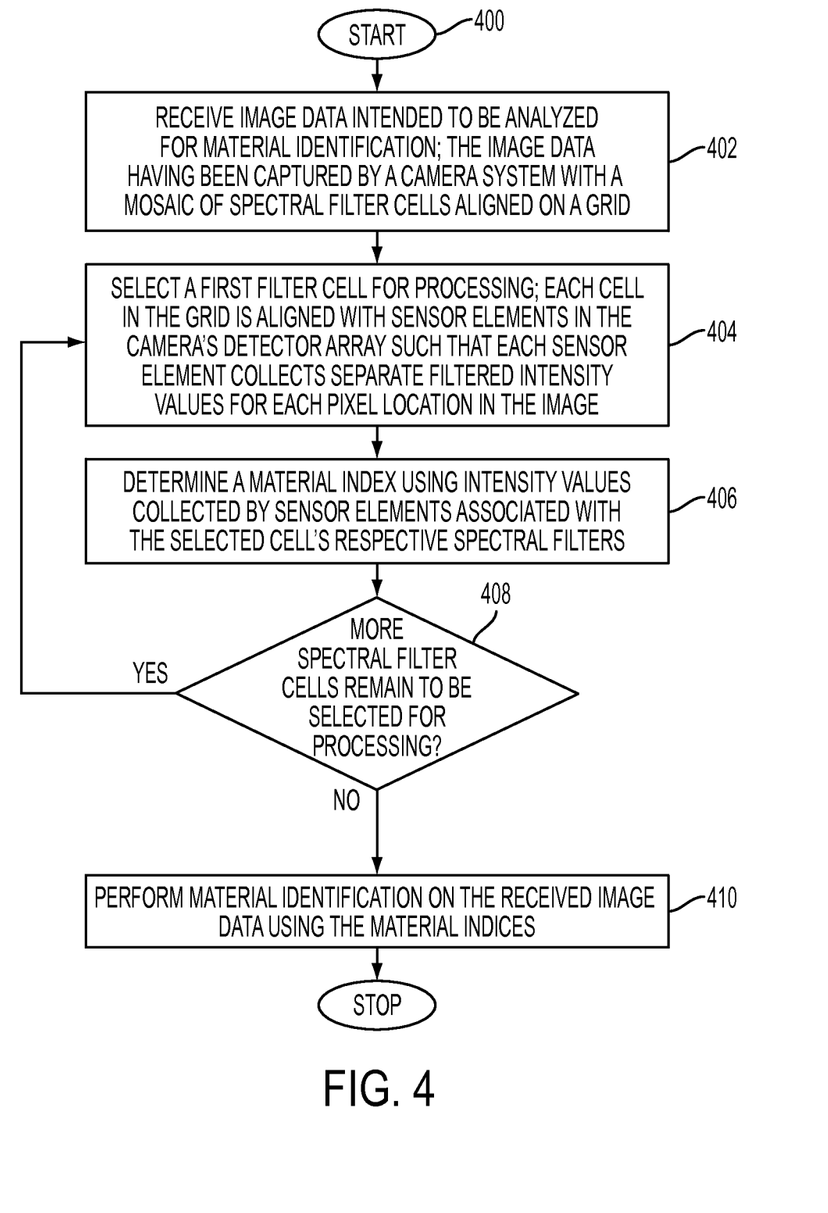
FIG. 4 is a flow diagram illustrating one embodiment of the present method for performing material identification from a patterned image acquired using an IR camera system with a mosaic of spectral filters arrayed in a geometric pattern.

Reference is now being made to the flow diagram of FIG. 4 which illustrates one embodiment of the present method for performing material identification from a patterned image acquired using an IR camera system with a mosaic of spectral filter cells arrayed in a geometric pattern. Flow processing begins at 400 and immediately proceeds to step 402.

At step 402, receive a patterned image to be analyzed for material identification.

At step 404, select a first spectral filter cell for processing. The selection can be made using, for example, a computer keyboard of a workstation configured for processing the received image data. One such workstation is shown and discussed with respect to the block diagram of FIG. 5. Alternatively, the selection is done automatically based on knowledge of the number of spectral filter cells in the mosaic comprising of plurality of spectral filter elements used to acquire the raw image data or automatically based on the sequence of the received data.

At step 406, determine, for the selected spectral filter cell, a material index. Various embodiments for determining material indices have been incorporated herein by reference.

At step 408, a determination is made whether any more spectral filter cells remain to be selected for processing. If so, then processing continues with respect to step 404 wherein a next spectral filter cell is selected for processing.

A material index is determined for the next selected spectral filter cell using intensity values collected by sensor elements associated with this next selected cell's respective spectral filters. Processing repeats in such a manner until all desired spectral filter cells have been selected or otherwise identified for processing.

At step 410, perform material identification on the image using at least a portion of the material indices (obtained in step 408). Thereafter, in this particular embodiment, further processing ends.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Example Functional Block Diagram

Figure 5:
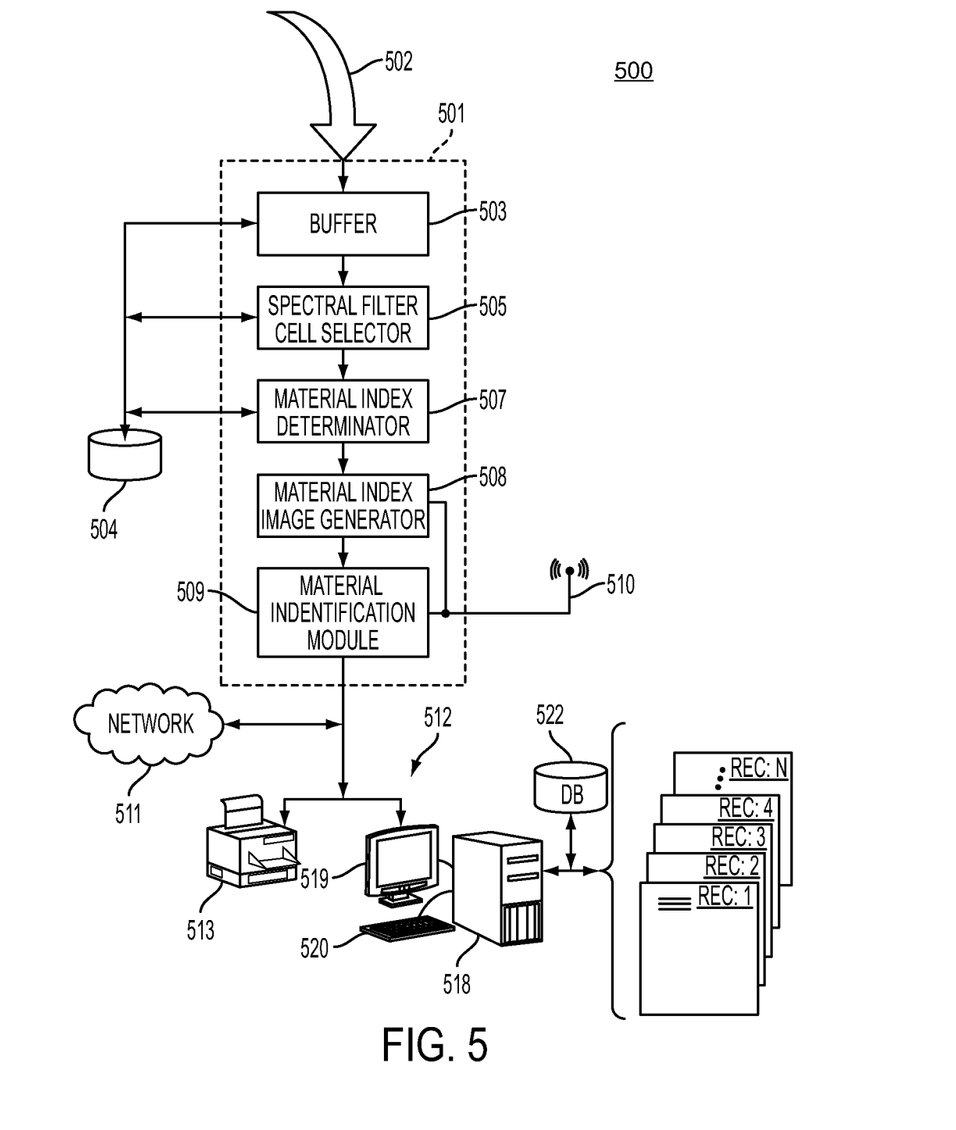
FIG. 5 is a block diagram of one example image processing system for implementing various aspects of the present method described with respect to the flow diagram of FIG. 4.

Reference is now being made to FIG. 5 which illustrates a block diagram of one example processing system 500 capable of implementing various aspects of the present method described with respect to the flow diagram of FIG. 4.

The embodiment of FIG. 5, image processing system 501 receives image data 502 into buffer 503 which has been captured using, for example, the camera system of FIG. 3. The Bayer pattern image corresponds to an image of a scene intended to be analyzed for material identification. Buffer 503 may be used for queuing information about the received image data and may further include, for instance, one or more target regions within the image that have been identified or otherwise selected for processing. The buffer may be configured to also store data, mathematical formulas and other representations to facilitate processing of the image in accordance with the teachings hereof. Such data can be stored to storage media 504. Spectral Filter Cell Selector 505 effectuates a selection of a particular filter cell for processing and, upon selection, proceeds to retrieve from the storage device, either sequentially or otherwise, the reflectances measured for all pixels in this filter cell. Material Index Determinator module 507 receives the selected filter cell and determines a material index using intensity values collected by sensor elements associated with the selected cell's respective spectral filters. The determined material indices can also be stored to the storage device. Material Index Image Generator 508 receives or otherwise retrieves the generated material indices and generates a material index image. The generated material index image may be communicated to workstation 512 for display and further processing using, for example, communication element 510 which may comprise a wired or wireless pathway. Material Identification Module 509 performs material identification on the image using at least a portion of the material index image. The identity of one or more objects in the image can be communicated to a remote device using communication element 510. For example, in a vehicle occupancy detection system, the number of people in the vehicle, as identified through human tissue materials identification is compared to a pre-determined number and, as a result of that comparison, a notification is transmitted to a vehicle traffic enforcement authority. Such a notification may take the form of a canned audio message or, for instance, a bell tone or a sonic alert being activated, or initiating a visible light which provides an indication such as, for instance, a blinking colored light. The communicated notification message can be a text, audio, and/or video message. Such embodiments are intended to be encompassed within the scope of the appended claims.

Any of the indices, identified objects, classifications, images, results, signals and/or parameters received or determined by any of the processing modules of system 501 can be communicated to workstation 512 and/or multi-function print system device 513 for further processing or rendering to hardcopy. Workstation 512 is shown comprising a computer case 518 housing a motherboard, CPU, memory, interface, storage device, and a communications link such as a network card. The computer workstation is also shown having a display device 519 such as a CRT, LCD, or touchscreen display. An alphanumeric keyboard 520 and a mouse (not shown) effectuate a user input. It should be appreciated that the workstation has an operating system and other specialized software configured to display a variety of numeric values, text, scroll bars, pull-down menus with user selectable options, and the like, for entering, selecting, or modifying information displayed on the display device. In the embodiment of FIG. 5, computer system 511 implements a materials spectra database 522 comprising a plurality of records. One materials spectra database is the High-Resolution Transmission Molecular Absorption Database (HITRAN) maintained by the Atomic and Molecular Physics Division of the Harvard-Smithsonian Center for Astrophysics. HITRAN is downloadable from Harvard's website. Although the database is shown as an external device, the database may be internal to computer case 518 mounted on a hard disk housed therein. A record refers to any data structure capable of containing information which can be indexed, stored, searched, and retrieved in response to a query. Any of the results of system 501 may also be stored and/or retrieved to any of the records in database 522. Such data and may further be communicated to remote devices over network 511. Many aspects of network 511 are commonly known and a further discussion as to the construction and/or operation of a specific network configuration has been omitted. Suffice it to say, data is transmitted in packets between networked devices via a plurality of communication devices and links using established protocols. Data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway.

Any of the modules and processing units of FIG. 5 are in communication with workstation 512 via pathways (not shown) and may further be in communication with one or more remote devices over network 511. It should be appreciated that some or all of the functionality for any of the modules of system 501 may be performed, in whole or in part, by components internal to workstation 512 or by a special purpose computer system. It should also be appreciated that various modules may designate one or more components which may, in turn, comprise software and/or hardware designed to perform the intended function. A plurality of modules may collectively perform a single function. Each module may have a specialized processor and memory capable of retrieving and executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through network 511.

Various Embodiments

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for material identification using a patterned image acquired by a multi-band IR camera system with a mosaic of spectral filter elements arrayed in a geometric pattern, the method comprising:

receiving simultaneously from a single image sensor of IR sensor elements that sense the same wavelengths for a multi-band IR camera system with a full pixel resolution, a high pixel resolution image being less than said full pixel resolution of said multi-band IR camera system and a low pixel resolution image being less than said high pixel resolution, captured by said multi-band IR camera system with an array of spectral filter cells arranged in a geometric pattern, each of said spectral filter cells comprises a plurality of spectral filter elements each filtering source light by a desired wavelength range of interest, each spectral filter element being aligned with sensor elements in said camera's image sensor, each sensor element collecting separate filtered intensity values for each respective pixel location in said image, and a first spatial filter which is physically larger than a second spatial filter, said first spatial filter creating said high pixel resolution image from said single image sensor, and said second spatial filter creating said low pixel resolution image from said single image sensor;

determining, for each spectral filter cell, a material index using intensity values collected by said sensor elements; and performing material identification on said image using at least a portion of said material indices.

2. The method of claim 1, wherein said geometric pattern comprises any of: a Bayer pattern and a hexagonal pattern.

3. The method of claim 1, wherein said spectral filters comprise at least 3 different filters with at least one filter falling in a wavelength range of one of: short pass, mid pass and long pass, all within the short wave infrared (SWIR) band.

4. The method of claim 1, wherein said spectral filters comprises at least 3 different filters with at least one filter falling in a wavelength range of one of: short wave infrared (SWIR), mid-wave infrared (MWIR), and long wave infrared (LWIR).

5. The method of claim 1, wherein said spectral filters comprise:

a first filter with a transmittance peaked in a range of 1000 nm to 1150 nm;

a second filter with a transmittance peaked in a range of 1400 nm to 1500 nm; and a third filter with a transmittance peaked in a range of 1550 nm to 1650 nm.

6. The method of claim 5, further comprising a fourth filter with a transmittance peaked in a range of 1150 nm to 1400 nm.

7. The method of claim 1, further comprising:

generating a material index image from said material indices; and performing material identification on said image using said material index image;

grouping pixels according to pixel material identification;

performing material identification based on said material index image.

8. The method of claim 1, wherein said material identification comprises performing a pixel classification comprising any of: a ratio method, a correlation coefficient method, and a best fitting reflectance method.

9. The method of claim 1, further comprising applying a threshold to said material index to obtain a binary mask associated with a particular material of interest.

10. A system for material identification using a patterned image acquired by a multi-band IR camera system with a mosaic of spectral filter elements arrayed in a geometric pattern, the system comprising:
a memory and a storage device;
a processor in communication with said memory and storage device, said processor executing machine readable instructions for performing:
receiving, simultaneously from a single image sensor of IR sensor elements that sense the same wavelengths for a multi-band IR camera system with a full pixel resolution, a high pixel resolution image being less than said full pixel resolution of said multi-band IR camera system and a low pixel resolution image being less than said high pixel resolution, captured by said multi-band IR camera system with an array of spectral filter cells arranged in a geometric pattern, each of said spectral filter cells comprises a plurality of spectral filter elements each filtering source light by a desired wavelength range of interest, each spectral filter element being aligned with sensor elements in said camera's detector array, each sensor element collecting separate filtered intensity values for each respective pixel location in said image, and a first spatial filter which is physically larger than a second spatial filter, said first spatial filter creating said high pixel resolution image from said single image sensor, and said second spatial filter creating said low pixel resolution image from said single image sensor;
determining, for each spectral filter cell, a material index using intensity values collected by said sensor elements;
performing material identification on said image using at least a portion of said material indices; and
storing said material indices to said storage device.

11. The system of claim 10, wherein said geometric pattern comprises any of: a Bayer pattern and a hexagonal pattern.

12. The system of claim 10, wherein said spectral filters comprise at least 3 different filters with at least one filter falling in a wavelength range of one of: short pass, mid pass and long pass, all within the short wave infrared (SWIR) band.

13. The system of claim 10, wherein said spectral filters comprises at least 3 different filters with at least one filter falling in a wavelength range of one of: short wave infrared (SWIR), mid-wave infrared (MWIR), and long wave infrared (LWIR).

14. The system of claim 10, wherein said spectral filters comprise:
a first filter with a transmittance peaked in a range of 1000 nm to 1150 nm;
a second filter with a transmittance peaked in a range of 1400 nm to 1500 nm; and
a third filter with a transmittance peaked in a range of 1550 nm to 1650 nm.

15. The system of claim 14, further comprising a fourth filter with a transmittance peaked in a range of 1150 nm to 1400 nm.

16. The system of claim 10, further comprising:
generating a material index image from said material indices; and
performing material identification on said image using said material index image;
grouping pixels according to pixel material identification;
performing material identification based on said material index image.

17. The system of claim 10, wherein said material identification comprises performing a pixel classification comprising any of: a ratio method, a correlation coefficient method, and a best fitting reflectance method.

18. The method of claim 1, wherein a sum of said low pixel resolutions being equal to said high pixel resolution being subtracted from said full pixel resolution.

19. The method of claim 1, further comprising:
using a first filter to receive said high pixel resolution image and a second filter to receive said low pixel resolution image, wherein said first filter comprises a plurality of first filters, a total number of said first filters being less than a total number of said second filters.

20. The system of claim 10, wherein a sum of said low pixel resolutions being equal to said high pixel resolution being subtracted from said full pixel resolution.

21. The system of claim 10, wherein any of said filters elements comprise a Fabry-Perot filter.

22. The system of claim 10, further comprising:
using a first filter to receive said high pixel resolution image and a second filter to receive said low pixel resolution image, wherein said geometric pattern is arranged such that said first filter is centered about a plurality of second filters.

23. The system of claim 10, further comprising:
using a first filter to receive said high pixel resolution image and a second filter to receive said low pixel resolution image, wherein said first filter comprises a plurality of first filters, a total number of said first filters being less than a total number of said second filters.

24. The system of claim 23, wherein said plurality of first filters are all a same size.

* * * * *